United States Patent
Fisher

[15] 3,698,425
[45] Oct. 17, 1972

[54] ADJUSTABLE BREATHING GAS PRESSURE REGULATOR

[72] Inventor: John A. Fisher, Fountain Valley, Calif.

[73] Assignee: U.S. Divers Company

[22] Filed: Feb. 3, 1970

[21] Appl. No.: 8,268

[52] U.S. Cl. ............137/505.25, 137/522, 267/177
[51] Int. Cl. ...........................................F16k 31/365
[58] Field of Search.........137/505.25, 522, 523, 530, 137/529, 505.28; 267/177

[56] References Cited

UNITED STATES PATENTS

| | | | |
|---|---|---|---|
| 2,855,950 | 10/1958 | Phillips | 137/505.28 |
| 3,565,108 | 2/1971 | Johnson | 177/529 |
| 614,441 | 11/1898 | Burnett | 137/505.25 |
| 1,457,544 | 6/1923 | Myers | 137/530 |
| 2,858,949 | 6/1959 | Evans | 137/505.25 |
| 3,426,790 | 2/1969 | Dey | 137/505.25 X |
| 3,437,109 | 4/1969 | Carlson | 137/505.25 |

*Primary Examiner*—Harold W. Weakley
*Attorney*—George F. Bethel

[57] ABSTRACT

An adjustable breathing gas pressure regulator comprising means for connecting a pressurized gas source to a chamber having a spring biased piston therein with a hollow stem for gas passage, terminating in a valve surface for closure with an adjacent seat. The spring bias on the piston is externally adjustable by radially positioned threaded members which have tapered ends spaced radially about the end of the spring so that when they are turned, and moved along a radius, the taper effectively compresses or releases the spring by a general wedging action at the end of the spring, thereby changing the operative pressure characteristics of the piston.

5 Claims, 3 Drawing Figures

INVENTOR.
JOHN A. FISHER
BY
George H. Bethel

ADJUSTABLE BREATHING GAS PRESSURE REGULATOR

BACKGROUND OF THE INVENTION

1. Field of the Invention

The field of this invention lies within the art of regulators for self contained underwater breathing apparatus.

2. Description of the Prior Art

Regulators which regulate a source of pressurized breathing gas for self contained underwater breathing apparatus generally have a spring biased piston. Although, there can be many variations of such regulators, most rely upon a spring biased piston for operating a valve connected thereto. The spring biased piston of such regulators usually moves in response to gas and ambient pressures imposed on the faces of the piston, balanced against the spring bias. The differential in pressure created by inhalation of a diver creates relative lower pressures on the piston. Inasmuch as the piston is operatively biased and accordingly balanced by a spring, the spring pressure on the piston is extremely critical. The spring pressure must be of such a degree that it will not overcontrol the valve, or create a "chattering" situation.

Previous to this invention, the adjustability of the spring which is used for biasing the piston has not been properly effectuated. Thus, to effect regulator adjustment in some cases it has been necessary to change springs or add shims. Furthermore, the adjustment of a regulator has not been easily provided without disassembly thereof by a person technically trained in the maintenance and adjustability of the regulators.

This invention has overcome the requirements for training and knowledge in the adjustment of regulators through a superior adjustment mechanism which can be easily operated to create a sure and accurate adjustment of the spring bias on the piston.

SUMMARY OF THE INVENTION

This invention provides an adjustable regulator for regulating breathing gas under pressure whereby the spring bias of the piston which controls the pressure of breathing gas can be easily and accurately adjusted.

Specifically, the bias of the piston spring can be adjusted by threaded radially placed members having tapered ends against which one end of the spring rests. The threaded members are spaced about the spring end, and moved radially with respect to the spring for adjustment thereof. Increased inward movement of the threaded members along the spring radius increases the compression loading of the spring. Outward movement decreases spring compression loading. This is due to the angle or slope of the taper on the threaded members decreasing in an inwardly radial direction. Thus, as the threaded members are threaded radially inwardly, the relative diameter of the taper with respect to the spring end increases, causing relative movement and compression of the spring.

The foregoing movement of the spring provided by the operative characteristics of this invention creates an adjustable spring bias on the piston. Thus, variation in the character and pressure on the face of the piston can be compensated for by adjusting the spring bias. Furthermore, fatigue and wear of the regulator can be compensated for during the life of the regulator. The foregoing adjustment thereby optimizes functional movement of the valve operated by the piston so that an easier and better regulated supply of gas is provided by the regulator.

DESCRIPTION OF THE PREFERRED EMBODIMENTS

Figure 1:
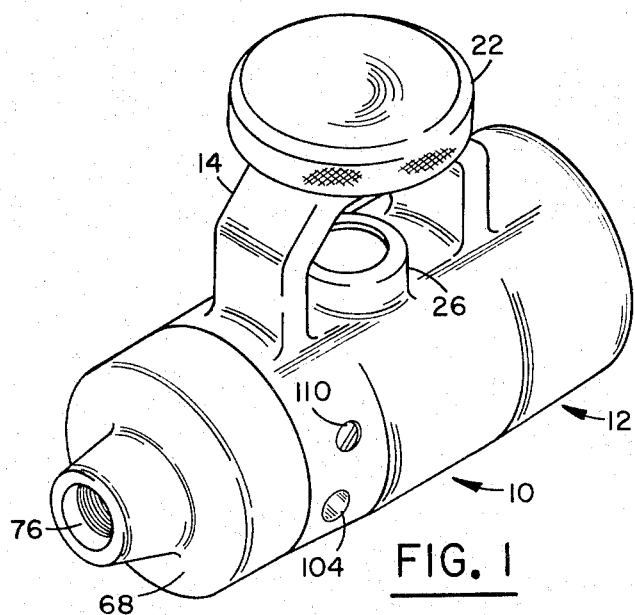
FIG. 1 is a perspective view of a regulator incorporating this invention.
Figure 3:
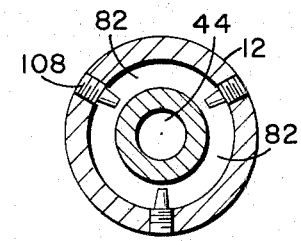
Figure 2:
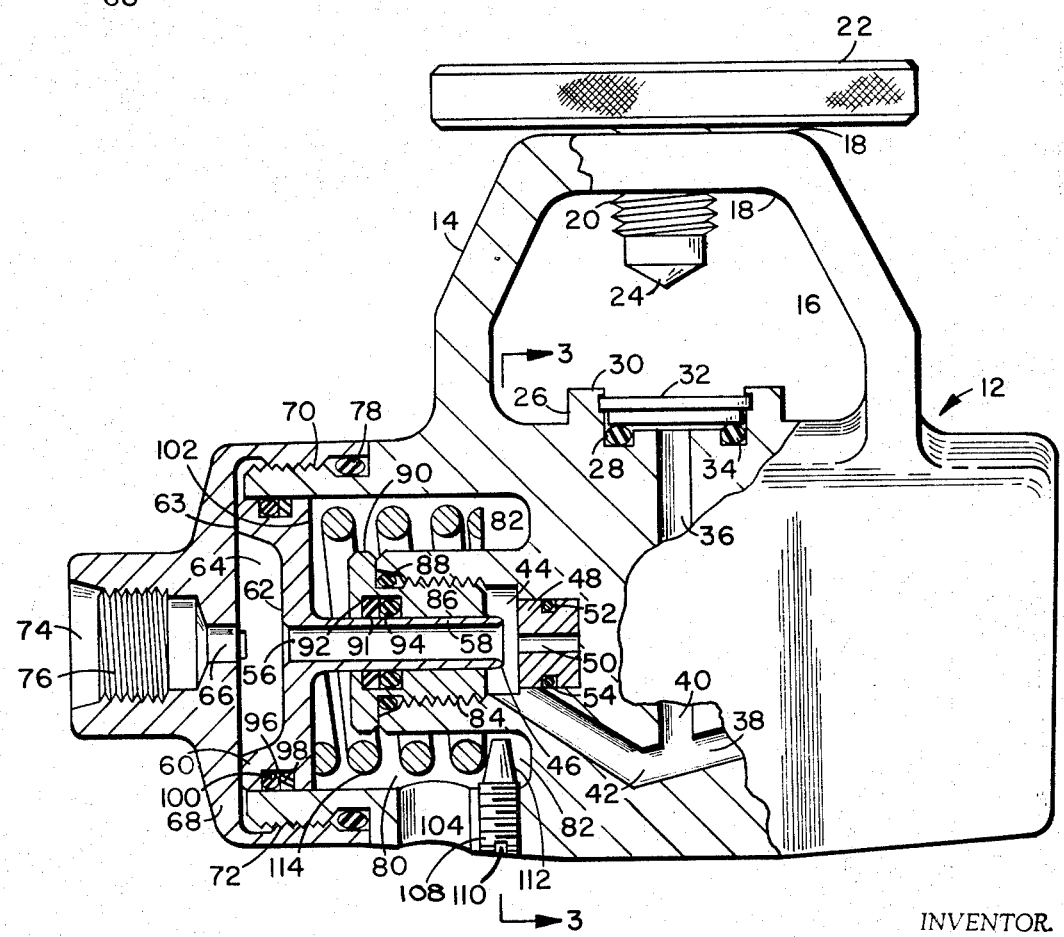
FIG. 2 is a partially fragmented midline cross-sectional view of the regulator shown in FIG. 1; and, FIG. 3 is a cross-sectional view of the interior portion of the regulator along line 3—3 of FIG. 2.

FIGS. 1 and 2 show a regulator 10 of this invention having a main body portion 12 which is preferably forged of metal as a unitary body. The main body 12 has a yoke 14 which provides a space 16 therethrough. The yoke has an upper bridge 18 which is internally threaded. The internally threaded bridge 18 receives a round threaded cylinder 20 attached to a knurled knob 22 at one end thereof. At the other end of the threaded cylinder, a radially chamfered end 24 is provided.

Within the yoke 14, and formed as a part of the main body 12, is a circumferential flange 26 extending as an annular ridge around the top of the main body portion 12. The circular flange 26 extends downwardly and terminates in an annular groove 28 which is machined into the main body portion 12. The circular flange 26 also has an annular groove 30 which circumscribes the interior diameter of the circular flange 26. Seated within the annular groove 30 and interior of the circular flange 26 is a foraminous or sintered metal filter 32. In order to seal the filter 32 against peripheral leakage, an O-ring 34 is provided which prevents the passage of gas around the edges of the filter 32.

The foregoing structural features of this invention allow a fitting such as the neck of a compressed bottle of breathing gas to be inserted within the space 16 provided in the yoke 14. The knurled knob can be turned to effectively drive the fitting against the surface of the circumferential flange 26 so that a sealed connection is provided for the passage of gas under pressure through a fitting and into the regulator.

Beneath the filter 32 a first passage 36 is provided leading into the interior of the regulator. The movement of gas through the first passage 36 is sometimes controlled in some regulators by a pressure warning indicator so that a diver will not completely use his source of breathing gas without knowing it. In such a device the passage of gas can be shunted through an alternate conduit leading to a second passage 38, or through the passage 40. In either case gas under pressure is delivered to a delivery conduit 42 which connects with a valve chamber 44.

The control of gas which is delivered to the valve chamber 44 is controlled by means of a valve surface 46 in conjunction with a resilient valve seat 48. The resilient valve seat 48 in this case can be formed of a plastic-like or rubber material against which the valve surface 46 can rest. The valve surface 48 which is formed as a thickened disc with an opening 50 therein and an annular groove 52, receives an O-ring 54 in the annular groove. The O-ring 54 serves to prevent leakage of gas around the valve seat 48. The opening 50 is merely provided so that upon assembly and disassembly the valve seat 48 may be easily removed from the cavity into which it is seated in the main body portion 12.

The valve surface 46 which has been rounded in this embodiment opens from the valve chamber 44 into an elongated axial passage 56 within a piston stem 58 which is formed as part of a piston 60. The piston 60 has a downstream depressed face 62 with an outer flange 63 forming a cavity 64 which connects to an opening 66 bored through an end cap or collar 68. The end cap 68 is threaded onto the main body portion 12 of the regulator by interior threads 70 threaded outwardly onto exterior threads 72 on the main body portion 12. The passage 66 leading through the collar 68 opens into a second flared passage 74 having an interior threaded portion 76 for receipt of a hose connection. To prevent leaks between the collar 68 and the main body portion 12 where it is connected, an O-ring 78 is implaced therebetween.

Within the main body portion 12 of the regulator, a cavity 80 is provided for housing some of the foregoing. The cavity 80 terminates in an elongated annular groove 82, and an interior cavity having interior threads 84 which extend from the valve chamber 44.

An exteriorly threaded nut 86 is threaded into the interior threads 84 of the opening and sealed against the main portion of the valve body by an O-ring 88. The exteriorly threaded nut 86 has a head 90 which rests against the main body portion 12, and is spaced therefrom sufficiently to permit the O-ring 88 to seal the exteriorly threaded nut 86 against the main body.

The exteriorly threaded nut 86 has an axial bore therethrough with an interior annular groove 92 which maintains a spacing disc 91 and an O-ring 94 therein for sealing the piston stem 58 dynamically as it moves reciprocately in the nut 86. The head of the piston 60 proximate the flange thereof has an annular exterior groove 96 which receives a spacer or washer 98 and an O-ring 100 which dynamically seals the piston 60 against the walls of the cavity 80 within the main body portion 12. In order to admit ambient pressure against the upstream surface 102 of the piston, at least one opening 104 is provided through the walls of the main body portion 12.

Within the main body portion 12 two or more threaded members 108 are provided having slotted socketed, or other type screw heads 110. The threaded members 108 have tapered ends 112 so that when they are threaded inwardly, the effective spacing of the members with respect to a similar radial point of the cavity 82 decreases.

Interposed between the back or upstream side 102 of the piston 60 and the tapered portion 112 of the threaded members 108 is a spring 114. The spring 114 is seated against the tapered portion 112 of the threaded members 108 so that upon turning the screw head 110 thereof adjustment may be made as to the amount of compression on the spring 114. This is provided by the radial movement of the members 108, so that the tapered portions 112 tend to wedge at a more or lesser degree the end of the spring 114. In other words, when the threaded members 108 are moved inwardly, the wedging action of the tapered ends 112 is increased thereby decreasing the space in which the spring is interposed and increasing the compression thereof.

The adjustability of the spring 114 allows compensation for variances in pressure on the face of the piston 62, and also in passage 66. As can be appreciated, such variances are desirous in order to adjust the outlet pressure in order to compensate for manufacturing variations in a demand regulator used downstream from this adjustable breathing gas regulator.

As can be appreciated, the adjustability features of this and other regulators may be provided by differently sized or configured elements substituted for the threaded members 108 to change the spring seating and compression thereof. Thus, this invention has broad application and is only to be read in light of the scope and spirit thereof as claimed.

I claim:

1. In a regulator for controlling a source of pressurized breathing gas, the improvement which comprises:
   a cavity within the regulator;
   a piston positioned for sliding movement within said cavity;
   a coil spring to bias said piston with respect to pressure forces encountered thereon;
   a stem connected to said piston having an elongated passage therethrough;
   a valve surface on said piston stem;
   a seat against which said valve surface of said stem can be seated; and,
   a tapered member which tapers in the direction of said coil spring radius which serves as a surface against which said spring rests so that when said member is moved radially with respect to said spring, it effectuates a change in compression thereof.

2. A regulator as claimed in claim 1 wherein said tapered member comprises:
   a cylinder threaded into said regulator and terminating in a tapered portion which provides a surface against which said spring rests; and,
   means for turning said cylinder exposed to the exterior of said regulator.

3. An adjustable regulator for controlling a source of breathing gas under pressure comprising:
   a conduit within said regulator for connection at one end to a source of breathing gas;
   valve means downstream from said breathing gas source to control the flow of breathing gas through said conduit;
   a piston connected to said valve means which responds to gas pressure forces for movement within said conduit;
   a coil spring for mechanically biasing said piston with respect to breathing gas pressures;
   an adjustable member mounted for radial movement with respect to said spring to adjust the bias thereof, said adjustable member comprising a threaded cylinder having a tapered end portion interiorly of said regulator wall against which said spring can rest; and, means for turning said cylinder.

4. An adjustable regulator as claimed in claim 3 further comprising:

a sealing means oriented circumferentially with respect to said piston for sealing said piston against the passage of gas around the circumference thereof.

5. An adjustable regulator as claimed in claim 4 wherein said valve means comprise:

a piston stem extending from the upstream side of said piston having a passage therethrough terminating in a valve surface; and, resilient seating means against which said valve surface can rest to curtail the flow of breathing gas through said passage.

* * * * *